US006480824B2

(12) United States Patent
Christensson et al.

(10) Patent No.: US 6,480,824 B2
(45) Date of Patent: *Nov. 12, 2002

(54) METHOD AND APPARATUS FOR CANCELING NOISE IN A MICROPHONE COMMUNICATIONS PATH USING AN ELECTRICAL EQUIVALENCE REFERENCE SIGNAL

(75) Inventors: Nils Christensson, Malmö (SE); Alberto Jimenez Feltström, Löberöd (SE)

(73) Assignee: Telefonaktiebolaget L M Ericsson (publ) (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 09/351,267

(22) Filed: Jul. 12, 1999

(65) Prior Publication Data

US 2002/0065650 A1 May 30, 2002

Related U.S. Application Data

(60) Provisional application No. 60/137,468, filed on Jun. 4, 1999.

(51) Int. Cl.[7] .......... G10L 15/20

(52) U.S. Cl. .......... 704/233; 704/226; 704/227; 381/719; 379/3

(58) Field of Search .......... 704/221, 233, 704/243, 244, 226, 234; 379/93.09, 406, 410, 406.03, 406.15, 3, 22.02; 381/94.7, 71.9, 92, 94.1; 370/286, 289

(56) References Cited

U.S. PATENT DOCUMENTS 4,238,746 A 12/1980 McCool et al. .......... 333/166
5,127,055 A * 6/1992 Larkey .......... 704/244

(List continued on next page.)

FOREIGN PATENT DOCUMENTS

JP 03269498 * 12/1991 .......... 704/226
WO WO 96/24128 8/1996

OTHER PUBLICATIONS

Bernard Widrow, et al.; "Adaptive Noise Cancelling: Principles and Applications"; *Proceedings of the IEEE*, vol. 63, No. 12, Dec. 1975, pp. 1692–1716.

(List continued on next page.)

*Primary Examiner*—Marsha D. Banks-Harold
*Assistant Examiner*—Abul K. Azad
(74) *Attorney, Agent, or Firm*—Jenkens & Gilchrist, A Professional Corporation

(57) ABSTRACT

In a technique for canceling noise from a microphone communications path, an electrical equivalence circuit which is positioned close to and electrically matched to the microphone produces a signal free reference signal. The microphone converts speech to a voice signal. An analog multiplexer alternately switches from the microphone to the electrical equivalence circuit to produce a multiplexed analog signal composed of the voice signal from the microphone and the signal free reference signal from the electrical equivalence circuit. A wire connects the output of the analog multiplexer switch to an A/D converter. The wire picks up noise from the surrounding environment. The A/D converter converts the multiplexed signal having the noise to a plurality of voice samples taken from the voice signal portion of the multiplexed signal and a plurality of noise samples taken from the signal free reference signal portion of the multiplexed signal. A noise cancellation unit applies a noise suppression algorithm (e.g., spectral subtraction) to the plurality of noise samples and the plurality of voice samples to reproduce the voice signal with the noise suppressed.

27 Claims, 5 Drawing Sheets

U.S. PATENT DOCUMENTS

| | | | | | |
|---|---|---|---|---|---|
| 5,212,764 | A | * | 5/1993 | Ariyosi | 704/233 |
| 5,563,954 | A | * | 10/1996 | Ono et al. | 381/94.7 |
| 5,696,819 | A | | 12/1997 | Suizu et al. | 379/390 |
| 5,748,752 | A | | 5/1998 | Reames | 381/94.1 |
| 5,781,883 | A | * | 7/1998 | Wynn | 704/226 |
| 5,796,819 | A | | 8/1998 | Romesburg | 379/406 |
| 5,907,825 | A | * | 5/1999 | Tzirkel-Hancock | 704/243 |
| 5,917,921 | A | * | 6/1999 | Sasaki et al. | 381/92 |
| 6,078,884 | A | * | 6/2000 | Downey | 704/243 |
| 6,275,591 | B1 | * | 8/2001 | Hsueh et al. | 381/71.11 |
| 6,317,501 | B1 | * | 11/2001 | Matsuo | 381/122 |

OTHER PUBLICATIONS

Deller, et al.; *Discrete–Time Processing of Speech Signals*, IEEE Press, 1993, pp. 506–516.

EPO Standard Search Report No. RS 103488 dated Apr. 14, 2000.

* cited by examiner

METHOD AND APPARATUS FOR CANCELING NOISE IN A MICROPHONE COMMUNICATIONS PATH USING AN ELECTRICAL EQUIVALENCE REFERENCE SIGNAL

CROSS-REFERENCE TO RELATED APPLICATION

This Application for Patent claims the benefit of priority from, and hereby incorporates by reference the entire disclosure of, now abandoned U.S. Provisional Application for Patent Serial No. 60/137,468, filed Jun. 4, 1999.

FIELD OF THE INVENTION

The present invention relates generally to a technique in digital mobile communications and, more particularly, to a technique for canceling noise in a microphone communications path.

BACKGROUND OF THE INVENTION

In a digital mobile phone, communications are conducted through two possible communications paths. In the first communications path, a microphone of the mobile phone picks up the voice activity of a human user, the subsequent voice activity is converted to an electrical signal, the electrical signal is converted by an analog-to-digital converter into a digitized information stream, the digitized information stream is modulated onto a radio carrier, and the modulated radio carrier is then transmitted over a radio link to a receiver of a base station. In the second communications path, the base station transmits a radio carrier modulated by digital information to the mobile phone, the modulated radio carrier is demodulated by a demodulator of the mobile phone, the demodulated waveform is passed to a digital-to-analog converter, and the analog output of the digital-to-analog converter is directed to a loudspeaker.

A mobile phone implementing the above communications paths comprises many discrete physical components packed into a small area. Consequently, electromagnetic energy of a particular frequency may escape from some of these components into the surrounding environment potentially causing noise interference to the other components of the mobile phone. Of particular concern to a designer of a mobile phone is the microphone and loudspeaker of the mobile phone, both of which are subject to picking up this noise from the other components of the mobile phone. This is because the wire connecting the microphone to the analog-to-digital converter and the wire connecting the digital-to-analog converter to the loud speaker are both potentially vulnerable to picking up any electromagnetic energy transmitted from any of the other components. A particular problem is the 217 Hz sending frequency radiated by A Time Division Multiple Access (TDMA) transmitter of a GSM mobile phone. This noise when heard by human ears resembles the sound of a bumblebee and is thus known as bumblebee noise.

Previously, the problem of noise from other components has been solved by careful design of the wires to the loudspeaker and from the microphone. However, this is not an efficient solution to the problem of electromagnetic interference because this solution requires an experimental arrangement of physical components by a skilled designer.

In view of the foregoing, it would be desirable to provide a technique for canceling noise (such as bumblebee noise) in microphones which overcomes the above-described inadequacies and shortcomings. More particularly, it would be desirable to provide a technique for canceling noise in microphones in an efficient and cost effective manner.

SUMMARY OF THE INVENTION

According to the present invention, a technique is provided for canceling noise in a microphone communications path. The microphone converts speech to a voice signal. An electrical equivalence circuit is placed in close proximity to and electrically matches the microphone so as to produce a signal free reference signal. An analog multiplexer alternately switches between the microphone to the electrical equivalence circuit to produce a multiplexed signal comprising the electrical voice signal from the microphone and the signal free reference signal from the electrical equivalence circuit. A communications path (typically a wire) connects the analog multiplexer to an A/D converter. The communications path carries the multiplexed signal through a noise intensive environment such that the multiplexed signal acquires a noise component. The A/D converter converts the multiplexed signal having the noise component to a plurality of voice samples and a plurality of noise samples. A noise cancellation unit applies a noise suppression procedure (e.g., spectral subtraction) to the plurality of noise samples and the plurality of voice samples to reproduce the voice signal without the noise component.

In a further aspect of the present invention, the plurality of noise samples are taken from the signal free reference signal of the multiplexed signal having the acquired noise component.

In yet a further aspect of the present invention, the plurality of signal samples are taken from the voice signal of the multiplexed signal having the acquired noise component.

In another aspect of the present invention, the analog multiplexer switches from the voice signal to the signal free reference signal at a rate of 16 kHz.

In still another aspect of the present invention, the A/D converter samples the multiplexed signal at a rate of 16 kHz.

In another aspect of the present invention, the voice signal from the microphone is sampled by the A/D converter at an 8 kHz rate.

In yet another aspect of the present invention, the signal free reference signal is sampled by the A/D converter at an 8 kHz rate.

In still another aspect of the present invention, the noise component includes bumblebee noise centered at approximately a 217 Hz signal.

In yet another aspect of the present invention, the noise cancellation unit applies a spectral subtraction procedure to the plurality of noise samples and the plurality of voice samples to produce a voice signal without the noise component.

In still another aspect of the present invention, there is a transmitter and the noise component is a result of electromagnetic energy generated by the transmitter radiating the electromagnetic energy centered at a predetermined frequency. Typically, the predetermined frequency is approximately 217 kHz.

In still another aspect of the present invention, a microphone converts speech to a voice signal. An electrical equivalence circuit, in close proximity to and electrically matching the microphone produces a signal free reference signal. A first communications path carries the voice signal from the microphone to the analog multiplexer. A second communications path carries the signal free reference signal from the electrical equivalence circuit to the analog multiplexer. The first and second communications paths are carried through a noise intensive environment such that the voice signal and the signal free reference signal both acquire a noise component. An analog multiplexer, connected to the first and second communications paths, alternately switches between the microphone and the electrical equivalence circuit to produce a multiplexed signal comprising the voice-laden component voice signal and the noise-laden component signal free reference signal. An A/D converter coupled to the analog multiplexer converts the multiplexed signal having the noise component to a plurality of voice samples and a plurality of noise samples. A noise cancellation unit applies a noise suppression procedure to the plurality of noise samples and the plurality of voice samples to reproduce the voice signal with the noise component suppressed.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

The present invention is employable in any one of many embodiments containing a microphone communications path subject to noise or interference, such as a radio, telephone, or mobile phone. An exemplary embodiment to which the teachings of the present invention are applicable to is that of a mobile phone. Thus, this detailed description is directed to a mobile phone employing the present invention.

Figure 1:
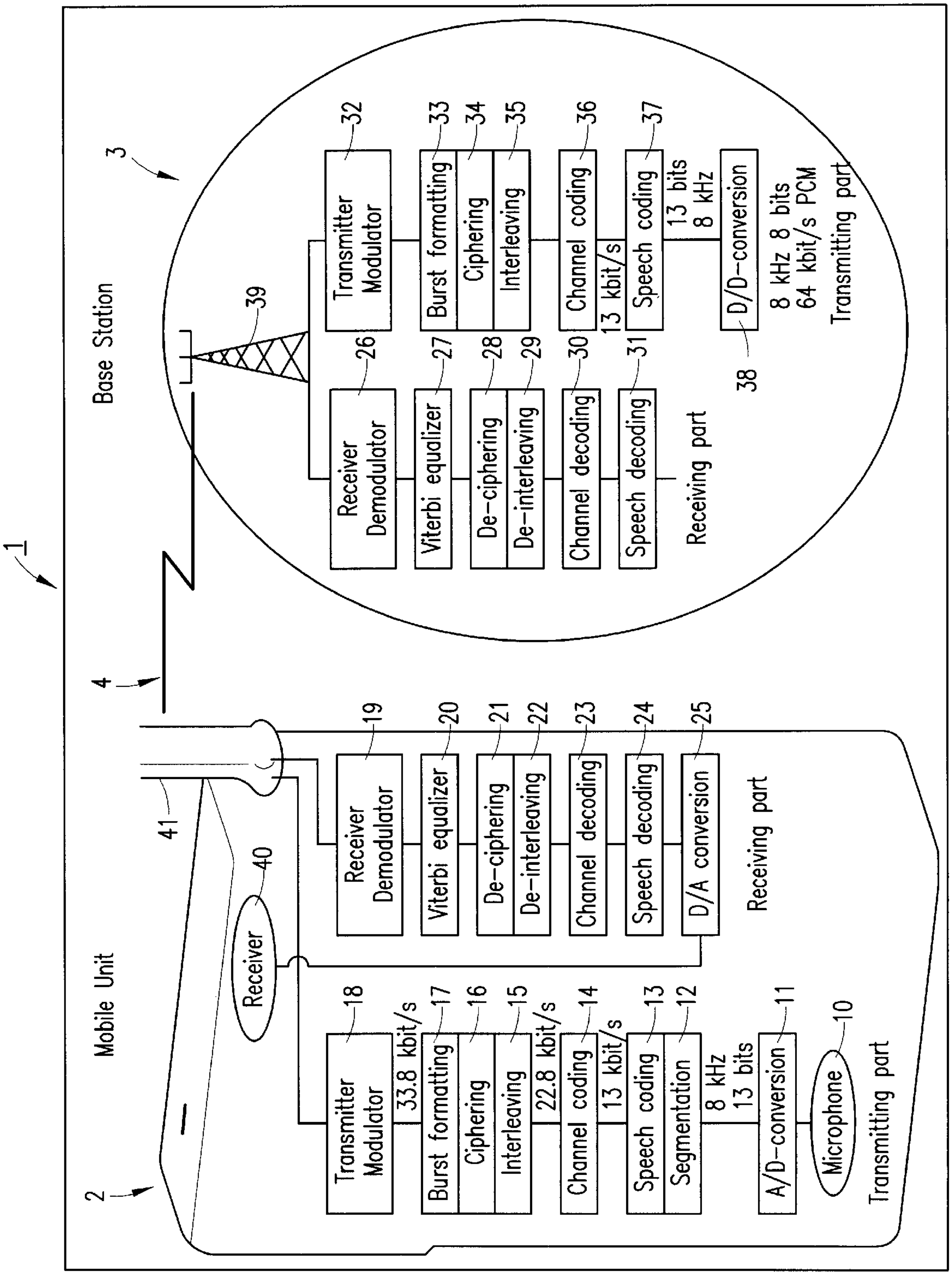
FIG. 1 illustrates the communications links of a mobile communications network.

Generally, FIG. 1 illustrates a Global System for Mobile Communications (GSM) system 1 comprising a mobile unit 2 and a GSM base station 3. The mobile unit 2 has a transmitting part and a receiving part. The transmitting part of the mobile unit 2 comprises a microphone 10, an analog-to-digital (A/D) converter 11, a segmentation unit 12, a speech coder 13, a channel coder 14, an interleaver 15, a ciphering unit 16, a burst formatting unit 17, and a transmitter modulator 18. The receiving part of the mobile unit 2 comprises a receiver 40 for transmitting sound to the user, a digital-to-analog converter (D/A) 25, a speech decoder 24, a channel decoder 23, a de-interleaver 22, a de-cipherer 21, a Viterbi equalizer 20, and a receiver demodulator 19. Antenna 41 transmits signals for the transmitter part and receives signals for the receiver part of mobile unit 2.

Base station 3 has a transmitting part and receiving part. The receiving part of base station 3 comprises a speech decoder 31, a channel decoder 30, a de-interleaver 29, a de-ciphering unit 28, a Viterbi equalizer 27, and a receiver demodulator 26. The transmitting part of base station 3 comprises a digital-to-digital (D/D) conversion unit 38 allowing input for data, a speech coder 37 for coding a voice signal, a channel coder 36, an interleaver 35, a ciphering unit 34, a burst formatting unit 33, and a transmitter modulator 32. Antenna 39 is used for both transmission by the transmitter part and reception by the receiving part of base station 3. Signals communicate between the mobile unit 2 and the base station 3 through a channel 4 which is typically an air interface.

Operation of the GSM system 1 precedes as follows for the case where the mobile unit 2 transmits and the base station 3 receives. A speaker speaks into microphone 10 producing an analog voice signal. The analog voice signal is applied to the A/D converter 11 resulting in a digitized speech signal. In GSM, 13 bits are used to quantize the signal into 8192 levels and the signal is sampled at an 8 kHz rate. The digitized speech waveform is then fed into the segmenter 12 which divides the speech signal into 20ms segments. The segments are fed into the speech coder 13 for reduction of the bit rate. Typically, speech coders defined for GSM today reduce the bit rate to 13 kbits/s, however, other bit rates are-also commonly used. The next steps are channel coding and interleaving. The channel coder 14 adds error correcting and error detecting codes to the speech waveform. The interleaver separates the consecutive bits of a message to protect against burst errors. The ciphering unit 16 adds bits to protect from eavesdropping. The burst formatting unit 17 adds the bits (adds start and stop bits, flags, etc.) to each GSM burst frame. A typical GSM burst frame designed to fit within a Time Division Multiple Access (TDMA) slot may have, along with several formatting bits, 57 encrypted data bits followed by a 26 bit training sequence for the Viterbi equalizer followed by 57 encrypted data bits. The transmitter modulator 18 applies Gaussian Minimum Shift Keying (GMSK) modulation to the bit stream input producing a modulated radio frequency signal at its output suitable for transmission. The modulated radio frequency signal is transmitted via antenna 41 over channel 4 to antenna 39 of base station 3.

The receiver demodulator 26 receives the modulated radio frequency signal and, demodulates the modulated radio frequency signal to a bit stream signal. The Viterbi equalizer 27 creates, based on the 26 bit training sequence, a mathematical model of the transmission channel 4, which in this case is an air interface, and calculates and outputs the most probable transmitted data. In the remaining signal processing chain, the de-ciphering unit 28 performs the inverse transformation performed by the ciphering unit 16, the de-interleaver 29 reverses the interleaving performed by interleaver 15, the channel decoder 30 reverses the channel coding of channel coder 14, and the speech decoder 31 recovers the digital speech stream. Operation of the GSM system 1 precedes in a similar way in the situation where the base station unit 3 transmits and the base station 2 receives.

Figure 2:
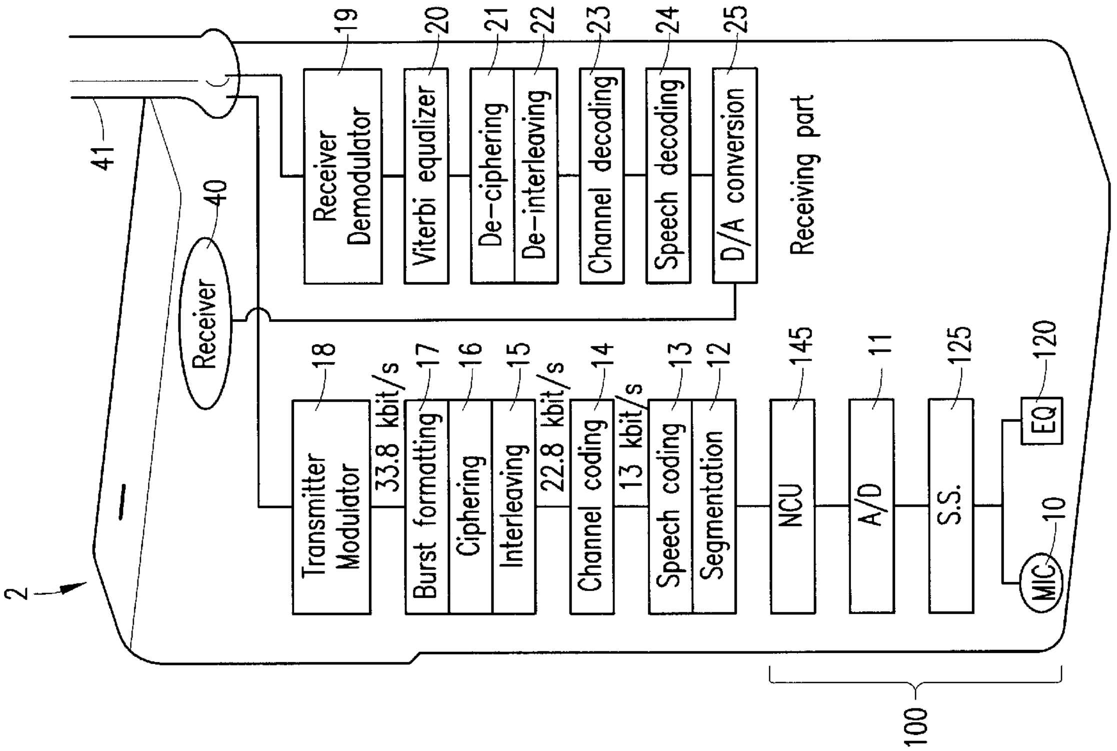
FIG. 2 illustrates a mobile phone employing the circuitry of the present invention.

FIG. 2 illustrates the mobile station 2 of FIG. 1 modified to include circuitry 100 for canceling noise from a microphone communications path according to the present invention. The circuitry 100 includes an electrical equivalence circuit 120 that is coupled to a first input of the analog multiplexer semiconductor switch (S.S.) 125. The microphone 10 is connected to a second input of the switch 125, while the A/D converter 11 is connected to an output of the switch 125. A noise cancellation unit 145 is connected to receive the output of the A/D converter 11.

Figure 3:
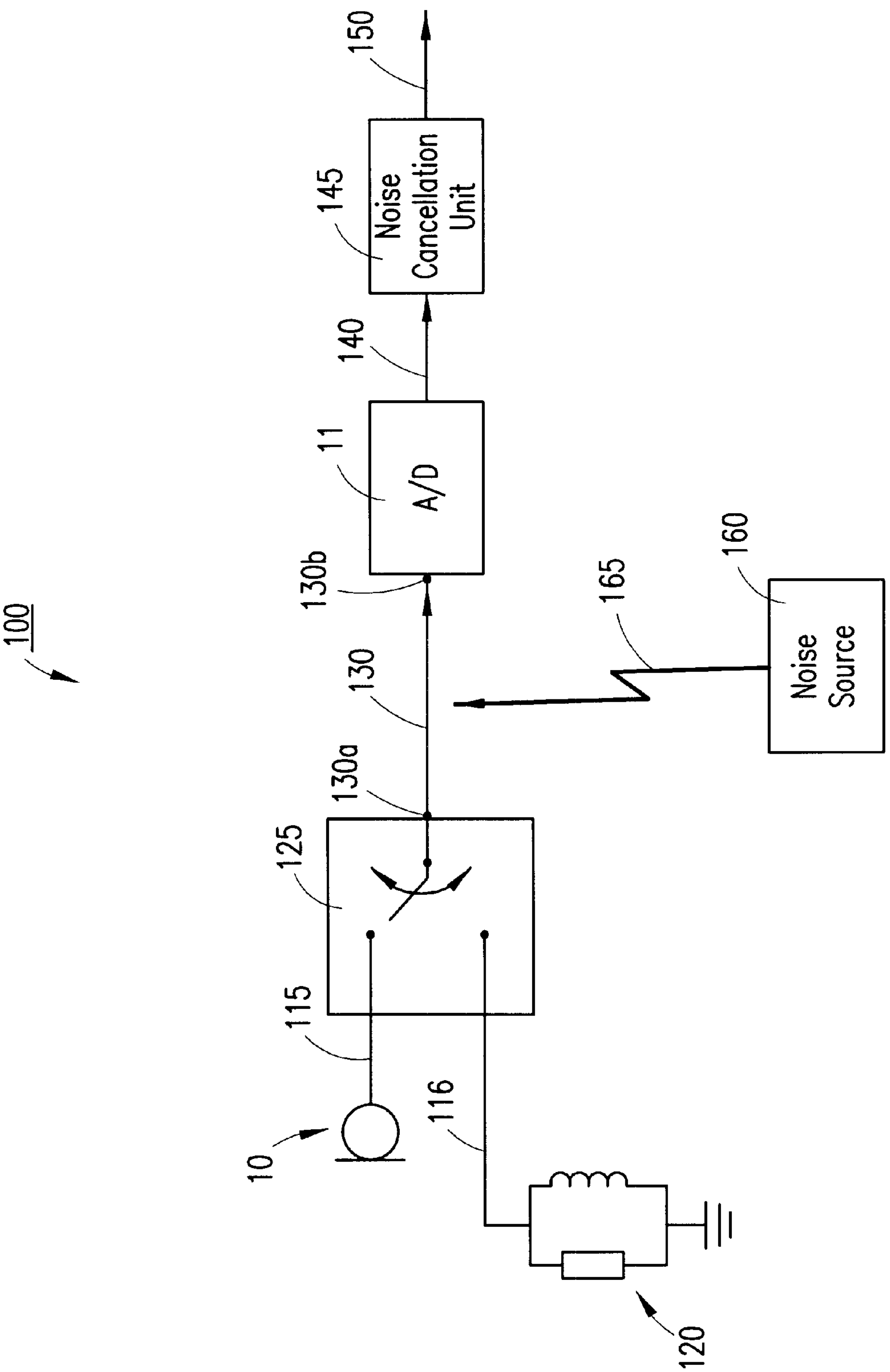
FIG. 3 is a block diagram illustrating circuitry for canceling noise in a microphone in accordance with the present invention.
Figure 4:
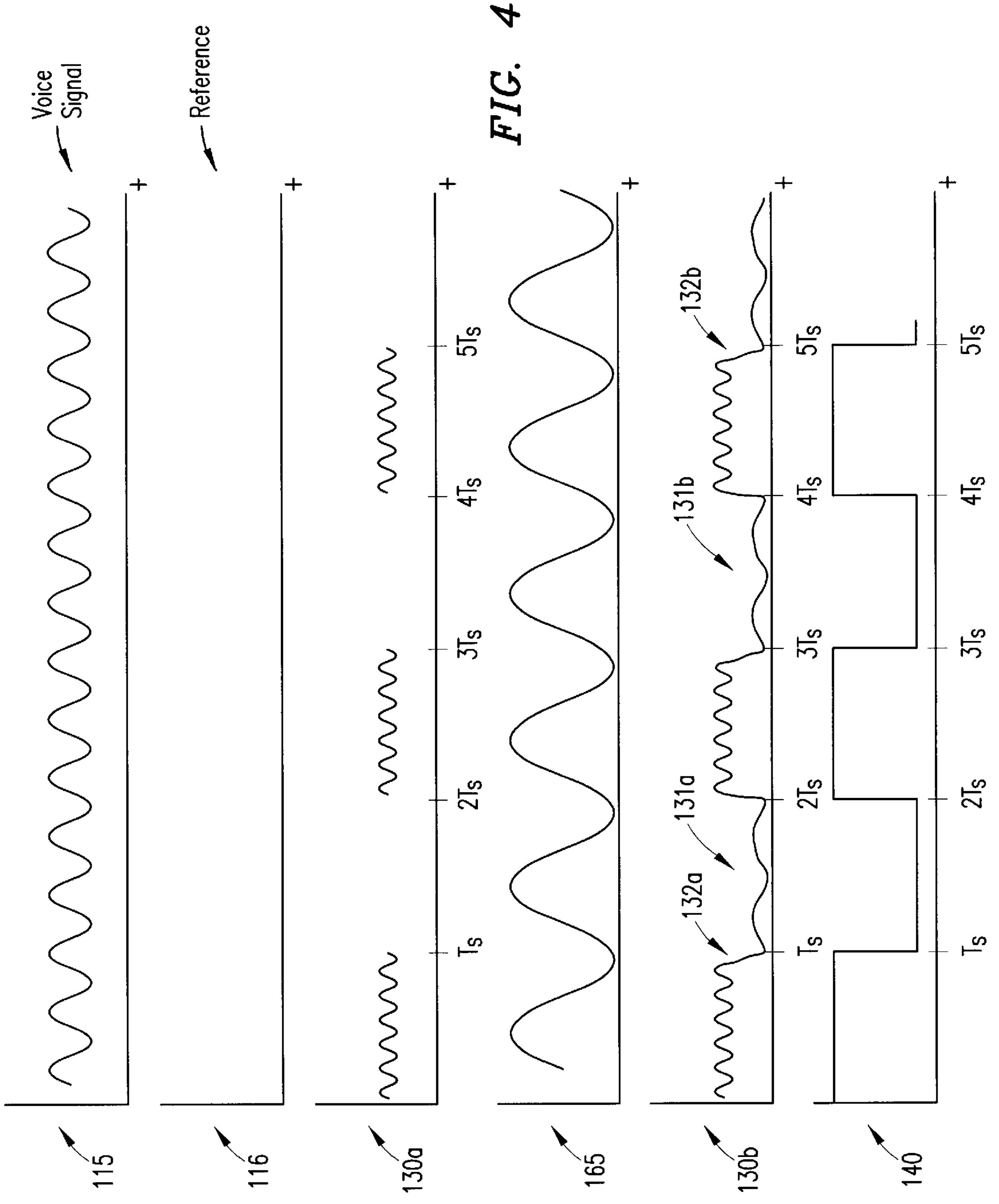
FIG. 4 is a series of timing diagrams illustrating signals produced at output locations of the circuitry of the present invention.

FIG. 3 illustrates in greater detail the circuitry 100 for canceling noise in a microphone communications path using an electrical equivalence reference signal according to the present invention. This apparatus 100 comprises a microphone 10, the electrical equivalence circuit 120, the analog multiplexer semiconductor switch (S.S.) 125, an analog-to-digital converter (A/D) 11, a communications path 130 connecting the analog multiplexer switch 125 at point 130*a* to the A/D converter 11 at point 130*b*, and the noise cancellation unit 145. FIG. 4 illustrates signals occurring at various points of the circuitry 100.

Referring to FIGS. 3 and 4, the microphone 10 produces an analog electrical voice signal 115 in response to speech produced by a human user. The electrical equivalence circuit 120 provides the same electrical characteristics as the microphone 10. Thus, the communications path 130 will have the same input impedance whether connected to the microphone 10 or the electrical equivalence circuit 120. When the electrical equivalence circuit 120 is connected at point 130*a*, a signal free reference signal 116 is provided by the electrical equivalence circuit 120. The signal free reference signal 116 is represented in FIG. 4 as an absence of a signal. The electrical equivalence circuit 120 and the microphone 10 should be positioned physically as close as possible to each other.

The analog multiplexer switch 125 switches at a selected switching rate alternately between the microphone 10 and the electrical equivalence circuit 120 producing a time multiplexed signal at the output 130*a* of switch 125. The time multiplexed signal is composed of the voice signal 115 and the signal free reference signal 116. The analog multiplexer switch 125 and the microphone 10 should also be positioned physically as close as possible to each other.

As previously described, the communications path 130, which is typically a wire ranging from approximately 4" to 5" long, connects the output of the analog multiplexer switch 125, at point 130*a* to the input of the A/D converter at point 130*b*.

The purpose of the present invention is to cancel out electromagnetic noise 165 added to the communications path 130 by a noise source 160. When the wire 130 is placed close to the noise source 160, which generates an electromagnetic field typically centered at a predetermined frequency, the wire 130 may pick up the electromagnetic noise 165. In the communications path 130, noise is any extraneous electromagnetic energy which tends to interfere with or produce undesirable disturbance to the reception of a desired signal, which in this case is the voice signal 115.

The electromagnetic noise 165 may potentially be generated from any noise source 160 in close physical proximity to the microphone 10, particularly any circuitry generating radio waves. In the mobile phone 2 of the GSM network 1, typically, the noise interference 165 is a radio interference signal centered approximately at 217 hertz, which is generated from a Time Division Multiple Access (TDMA) unit located in the transmitter module 18 (See FIG. 2). This noise when heard by human ears resembles the sound of a bumblebee and is thus known as bumblebee noise.

The time multiplexed signal at 130*a* picks up the noise 165 as it travels along the communications path 130, thereby producing a noisy time multiplexed signal at 130*b*. As shown in FIG. 4, the noisy time multiplexed signal at 130*b* comprises a plurality of signal samples (e.g., 132*a* and 132*b*) and a plurality of noise samples (e.g., 131*a*, 131*b*). The analog-to-digital converter 11 then samples the noisy multiplexed signal at 130*b* to provide digital samples to noise cancellation unit 145 over connection 140. In an exemplary embodiment, the analog multiplexer switch 125 and the A/D converter 11 are both synchronized at a sampling rate of 16 kHz. This results in the A/D converter 11 taking digital samples of the voice signal 115 at an 8 Khz rate and digital samples of the reference signal 116 at an 8 Khz rate.

The noise cancellation unit 145 may use any noise suppression algorithm of the signal processing arts, (e.g., spectral subtraction) to remove the noise 165 from the time multiplexed signal. The circuitry 100 provides to the suppression algorithm a plurality of accurate noise samples, for example, 131*a* and 131*b*. The noise samples 131*a* and 131*b* contain only the noise 165, in contrast to the plurality of signal samples, for example, 132*a* and 132*b*, which represent the voice signal 115 combined with the noise 165. Typical noise suppression algorithms that may be used in the noise cancellation unit 145 are described in B. Widrow et al., "Adaptive Noise Canceling: Principles and Applications," Proc. IEEE 63, No.12, pp 1692–1716, December 1975. Spectral subtraction is known in the signal processing art and is described, for example, by John R. Deller et al. in "Discrete-Time Processing of Speech Signals", Prentice Hall, New Jersey, 1993, ISBN 0-02-328301-7, pages 506–516.

The circuitry 100 of the present invention insures that the noise cancellation unit 145 is provided with a very accurate noise reference, which is needed in most noise canceling algorithms. The noise cancellation unit 145 outputs a digitized signal 150 which is free of the noise 165. In the mobile phone 2 of FIG. 2, the noise cancellation unit 145 feeds the noise free digitized signal 150 to the later stages of the communications link (i.e., segmentation unit 12, speech coder 13, and so forth).

Figure 5:
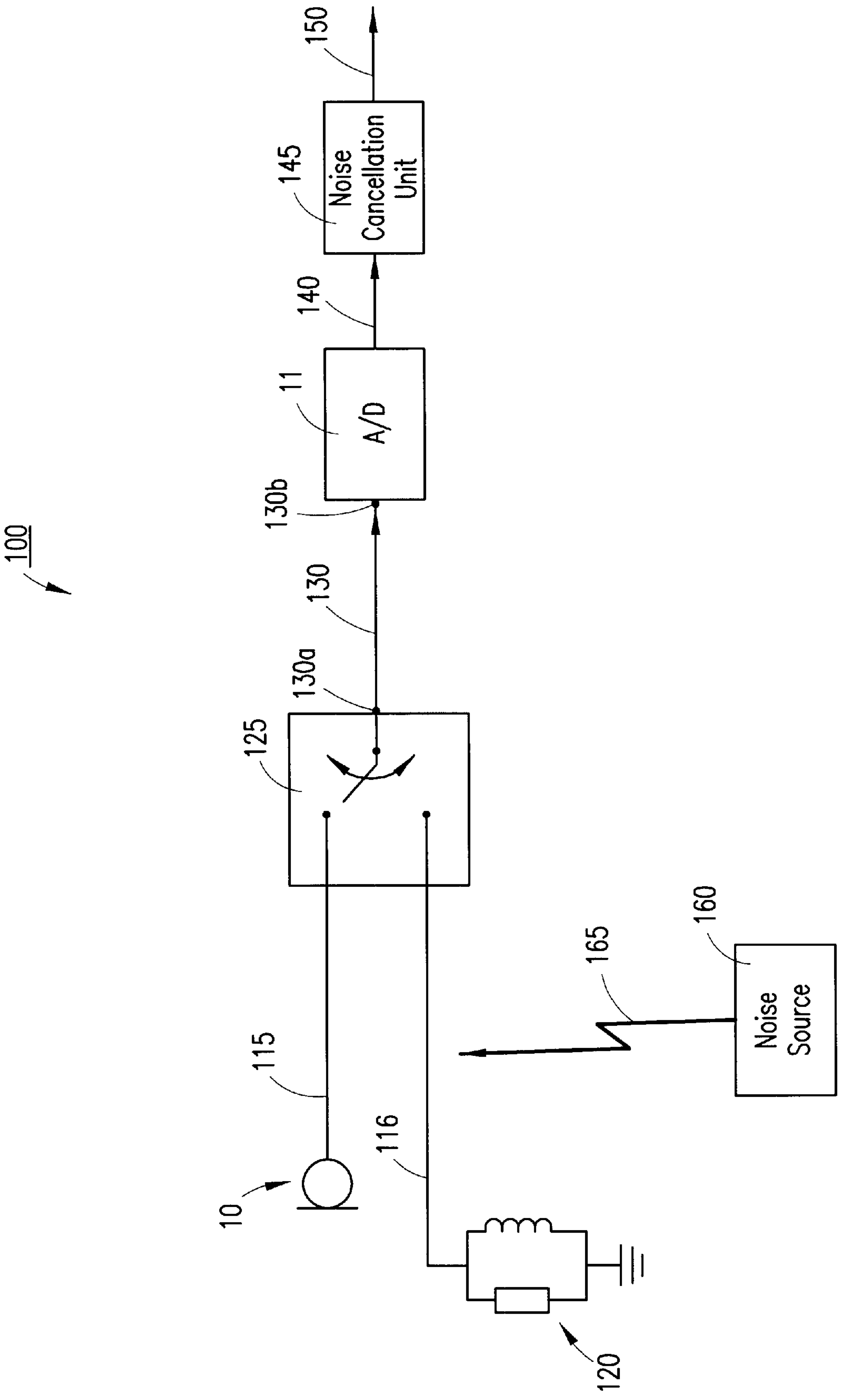
FIG. 5 is a block diagram illustrating a second embodiment of circuitry for canceling noise in a microphone in accordance with the present invention.

FIG. 5 illustrates a second embodiment of circuitry 100 for canceling noise in a microphone communications path using an electrical equivalence signal free reference signal according to the present invention. In this embodiment the switch 125 is sufficiently close to the A/D converter 11 so as to prevent any interference from entering the path 130. However, the paths 115 and 116 will now be longer, typically, from 4 to 5 inches in length. Thus, the paths 115 and 116 pick up the noise 165 from the noise source 160. The second embodiment of the circuitry 100 of FIG. 5 will in a manner work similar to the embodiment of FIG. 3 provided that the paths are similar so that the introduced noise 165 is approximately similar for both paths.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An apparatus for canceling electromagnetic noise in a microphone communications path, comprising:

a microphone configured to convert speech to an electrical voice signal;

an electrical equivalence circuit, in close proximity to and electrically matching the microphone, configured to produce a signal free reference signal;

an analog multiplexer configured to alternately switch between the microphone and the electrical equivalence circuit to produce a multiplexed signal comprising the voice signal and the signal free reference signal;

a communications path connected to the analog multiplexer for carrying the multiplexed signal through an electromagnetic noise intensive environment such that the multiplexed signal acquires an electromagnetic noise component;

an A/D converter connected to the communications path for converting the multiplexed signal having the noise component to a plurality of voice samples and a plurality of noise samples; and a noise cancellation unit applying a noise suppression procedure to the plurality of noise samples and the plurality of voice samples to reproduce the voice signal with the electromagnetic noise component suppressed.

2. The apparatus of claim 1, wherein:

the plurality of noise samples are taken from the signal free reference signal of the multiplexed signal having the acquired electromagnetic noise component.

3. The apparatus of claim 1, wherein:

the plurality of voice samples are taken from the voice signal of the multiplexed signal having the acquired electromagnetic noise component.

4. The apparatus of claim 1, wherein:

the communications path is a wire.

5. The apparatus of claim 1, wherein:

the analog multiplexer switches from the voice signal to the signal free reference signal at a rate of 16 kHz.

6. The apparatus of claim 1, wherein: the A/D converter samples the multiplexed signal at a rate of 16 kHz.

7. The apparatus of claim 1, wherein: the voice signal from the microphone is sampled by the A/D converter at an 8 kHz rate.

8. The apparatus of claim 1, wherein:

the signal free reference signal is sampled by the A/D converter at an 8 kHz rate.

9. The apparatus of claim 1, wherein:

the electromagnetic noise component includes bumblebee noise centered at approximately 217 Hz.

10. The apparatus of claim 1, wherein: the noise suppression procedure is a spectral subtraction procedure.

11. The apparatus of claim 1, further comprising:

a transmitter; and wherein:

the electromagnetic noise component is a result of electromagnetic energy generated by the transmitter radiating the electromagnetic energy centered at a predetermined frequency.

12. The apparatus of claim 11, wherein: the predetermined frequency is approximately 217 Hz.

13. The apparatus of claim 1, wherein the electrical equivalence circuit electrically matches the microphone by having the same electrical characteristics as the microphone.

14. The apparatus of claim 13, wherein the electrical equivalence circuit has the same impedance as the microphone.

15. The apparatus of claim 1, wherein the A/D converter and the multiplexer are synchronized at the same sampling rate.

16. A method for canceling electromagnetic noise in a microphone communications path, comprising:

converting speech from the microphone to an electrical voice signal;

producing a signal free reference signal from an electrical equivalence circuit in close proximity to and electrically matching the microphone;

switching alternately from the microphone to the electrical equivalence circuit to produce a multiplexed signal comprising the voice signal and the signal free reference signal;

carrying the multiplexed signal through an electromagnetic noise intensive environment such that the multiplexed signal acquires an electromagnetic noise component;

digitizing the multiplexed signal having the noise component to produce a plurality of voice samples and a plurality of noise samples; and applying a noise suppression procedure to the plurality of noise samples and the plurality of voice samples to reproduce the voice signal with the electromagnetic noise component suppressed.

17. The method of claim 16, wherein:

the plurality of noise samples are taken from a signal free reference signal part of the multiplexed signal having the acquired electromagnetic noise component.

18. The method of claim 16, wherein:

the plurality of signal samples are taken from a voice signal part of the multiplexed signal having the acquired electromagnetic noise component.

19. The method of claim 16, wherein:

the switching step includes the analog multiplexer switching from the voice signal to the signal free reference signal at a rate of 16 kHz.

20. The method of claim 16, wherein:

the digitizing step includes sampling the multiplexed signal at a sampling rate of 16 kHz to produce the plurality of voice samples and the plurality of noise samples.

21. The method of claim 16, wherein:

the digitizing step includes sampling the voice signal at an 8 kHz rate to produce the plurality of voice samples.

22. The method of claim 16, wherein:

the digitizing step includes sampling the signal free reference signal at an 8 kHz sampling rate to produce the plurality of noise samples.

23. The method of claim 16, wherein: the electromagnetic noise component includes bumblebee noise centered at approximately 217 Hz.

24. The method of claim 16, wherein:

the noise suppression procedure is a spectral subtraction procedure.

25. The method of claim 16, further comprising:

a transmitter; and wherein:

the noise component is a result of electromagnetic energy generated by the transmitter radiating the electromagnetic energy centered at a predetermined frequency.

26. The method of claim 25, wherein:

the predetermined frequency is approximately 217 Hz.

27. An apparatus for canceling electromagnetic noise in a microphone system, comprising:

a microphone configured to convert speech to an electrical voice signal;

an electrical equivalence circuit, in close proximity to and electrically matching the microphone, configured to produce a signal free reference signal;

a first communications path for carrying the voice signal from the microphone to an analog multiplexer, a second communications path for carrying the signal free reference signal from the electrical equivalence circuit to the analog multiplexer, the first and second communications paths being carried through an electromagnetic noise intensive environment such that the voice signal and the signal free reference signal both acquire an electromagnetic noise component;

said analog multiplexer, connected to the first and second communications paths, configured to alternately switch between the microphone and the electrical equivalence circuit to produce a multiplexed signal comprising the voice-laden component voice signal and the noise-laden component signal free reference signal;

an A/D converter coupled to the analog multiplexer for converting the multiplexed signal having the noise component to a plurality of voice samples and a plurality of noise samples; and a noise cancellation unit applying a noise suppression procedure to the plurality of noise samples and the plurality of voice samples to reproduce the voice signal with the electromagnetic noise component suppressed.

* * * * *